(12) United States Patent
Wang et al.

(10) Patent No.: US 8,514,854 B2
(45) Date of Patent: Aug. 20, 2013

(54) VIRTUAL ROUTER REDUNDANCY FOR SERVER VIRTUALIZATION

(75) Inventors: Sheng-Yih Wang, San Jose, CA (US);
Lok Yan Hui, Milpitas, CA (US);
Sanjay Khanna, Fremont, CA (US); Ivy Pei-Shan Hsu, Pleasanton, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 448 days.

(21) Appl. No.: 12/719,822

(22) Filed: Mar. 8, 2010

(65) Prior Publication Data

US 2011/0066753 A1  Mar. 17, 2011

Related U.S. Application Data

(60) Provisional application No. 61/186,364, filed on Jun. 11, 2009, provisional application No. 61/186,378, filed on Jun. 12, 2009, provisional application No. 61/268,474, filed on Jun. 11, 2009.

(51) Int. Cl.
*H04L 12/28* (2006.01)

(52) U.S. Cl.
USPC .......................................... 370/389; 709/238

(58) Field of Classification Search
USPC .......................................... 370/389; 709/238
See application file for complete search history.

(56) References Cited

U.S. PATENT DOCUMENTS

| | | | |
|---|---|---|---|
| 6,556,547 B1 * | 4/2003 | Srikanth et al. | 370/317 |
| 2003/0037165 A1 * | 2/2003 | Shinomiya | 709/238 |
| 2005/0007951 A1 * | 1/2005 | Lapuh et al. | 370/225 |
| 2006/0274768 A1 * | 12/2006 | Suzuki et al. | 370/401 |
| 2007/0230472 A1 * | 10/2007 | Jesuraj | 370/392 |

OTHER PUBLICATIONS

"Chapter 16, Configuring VRRP and VRRPE," Advanced Configuration and Management Guide for ProCurve 9300/9400 Series Routing Switches, HP, Jun. 2005, pp. 16.1-16.44.
"GLBP—Gateway Load Balancing Protocol," Cisco IOS Release 12.2(15)T, 42 pages, 2008.
"Caveats for Cisco IOS Release 12.21," Cisco IOS Release 12.2(15)T17, Mar. 26, 2008, 1 page.
"GLBP—Gateway Load Balancing Protocol," Cisco IOS Release 12.2(15)T, 2008.
"VMware ESX and VMware ESXi," VMware product datasheet, 2009, VMware, Inc.
Wikipedia description of "Virtual Router Redundancy Protocol," (VRRP), Jun. 9, 2009, http://en.wikipedia.org/wiki/Vrrp.
Hinden R., "Virtual Router Redundancy Protocol (VRRP)," RFC 3768, Apr. 2004, Category: Standards Track, Nokia.
Cross V., "Linux on IBM @server zSeries and S/390: Virtual Router Redundancy Protocol on VM Guest LANs," Redbooks Paper, 2003, IBM.
"Foundry Enterprise Configuration and Management Guide, Chapter 13, Configuring VRRP and VRRPE", printed Jun. 9, 2009.
Foundry Networks, "Chapter 38, Configuring VRRP and VRRPE," Foundry FastIron Configuration Guide, Jan. 2009, pp. 38.1-38.34.
"Technical White Paper for VRRPE," 2007, Huawei Technologies Co., Ltd.
"Brocade Serveriron ADX Series 1000, 4000, and 10000 Switches. Application Delivery Controllers for Next-Generation Data Centers," Product datasheet, 2009, Brocade Communication Systems, Inc.

* cited by examiner

*Primary Examiner* — Wei Zhao
(74) *Attorney, Agent, or Firm* — Nixon Peabody LLP; John P. Schaub

(57) ABSTRACT

A solution for virtual router redundancy for server virtualization includes, at a network device configured as a backup router of a virtual router, examining a packet stored in a memory of the network device. Responsive to the examining, the network device determines whether to forward the packet via a network towards a destination or to send the packet via the network to a master router of the virtual router for forwarding of the packet, by the master router, towards the destination.

13 Claims, 6 Drawing Sheets

VIRTUAL ROUTER REDUNDANCY FOR SERVER VIRTUALIZATION

CROSS REFERENCE TO RELATED APPLICATIONS

This application claims the benefit of the following provisional patent applications, the disclosures of which are incorporated herein in their entirety by reference:

U.S. Provisional Patent Application No. 61/186,364 filed Jun. 11, 2009, entitled "VRRP-E Extension for Server Virtualization;"

U.S. Provisional Patent Application No. 61/186,378 filed Jun. 12, 2009, entitled "Virtual Router Redundancy for Server Virtualization;" and U.S. Provisional Patent Application No. 61/268,474 filed Jun. 11, 2009, entitled "Virtual Router Redundancy for Server Virtualization."

FIELD OF THE INVENTION

Aspects of the present invention relates to virtual router redundancy for server virtualization.

BACKGROUND

Virtual Router Redundancy Protocol (VRRP) is a redundancy protocol described in Request for Comments (RFC) 3768 that is designed to increase the availability of a default gateway servicing hosts on the same subnet. This increased reliability is achieved by advertising a "virtual router" (an abstract representation of master and backup routers acting as a group) as a default gateway to the host(s) instead of one physical router. Two or more physical routers are then configured to stand for the virtual router, with only one doing the actual routing at any given time. If the current physical router that is routing the data on behalf of the virtual router fails, an arrangement is made for another physical router to automatically replace it. The physical router that is currently forwarding data on behalf of the virtual router is called the master router. Physical routers standing by to take over from the master router in case something goes wrong are called backup routers.

In VRRP, there is one Owner and one or more Backups for each virtual router. The Owner is the router that has the Internet Protocol (IP) address used for the virtual router. All the other routers supporting the virtual router are backups.

VRRP can be used over Ethernet, Multiprotocol Label Switching (MPLS), and token ring networks. VRRP provides information on the state of a router, not the routes processed and exchanged by that router. Each VRRP instance is limited in scope to a single subnet. It does not advertise Internet Protocol (IP) routes beyond that subnet or affect the routing table in any way.

VRRP-E is a proprietary version of VRPP offered by Brocade Communications Systems, Inc. of San Jose, Calif. Unlike VRRP, VRRP-E does not use Owners. All VRRP-E routers are Backups for a given virtual router. The router with the highest priority becomes the Master.

In existing VRRP and VRRP-E implementations, the data traffic sometimes needs to cross a wide area network (WAN) interface twice before it is forwarded towards the final destination. For example, traffic received by the backup router that needs to be sent through interfaces on the backup router to reach the final destination is first switched to the master router from the backup router, and then forwarded back to the backup router, where it is forwarded towards the final destination. This behavior can result in high packet forwarding times, inefficient WAN bandwidth utilization, and degraded router performance.

VMware ESX is an enterprise-level virtualization product offered by VMware, Inc. VMware ESX Server is a thin software layer designed to multiplex hardware resources efficiently among virtual machines running unmodified commodity operating systems. The basic server requires some form of persistent storage—typically, an array of hard disk drives—for storing the virtualization kernel and support files.

In server virtualization environments, there are typically many virtual servers that are configured to dynamically move between different VMware ESX servers connected by WAN links. Since each time a virtual server is activated it can be on different ESX, the behavior described above where traffic needs to cross the WAN twice before it reaches the client can occur frequently.

In a Gateway Load Balancing Protocol (GLBP) solution, the traffic from different servers can be load shared among different routers. However, all the traffic from a particular router will still be forwarded using the same gateway router. Therefore, a GLBP solution cannot be effectively used to address the problem of dynamically-moving virtual servers. Accordingly, a need exists in the art for an improved solution for virtual router redundancy for server virtualization.

SUMMARY OF THE INVENTION

A solution for virtual router redundancy for server virtualization includes, at a network device configured as a backup router of a virtual router, examining a packet stored in a memory of the network device. Responsive to the examining, the network device determines whether to forward the packet via a network towards a destination or to send the packet via the network to a master router of the virtual router for forwarding of the packet, by the master router, towards the destination.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
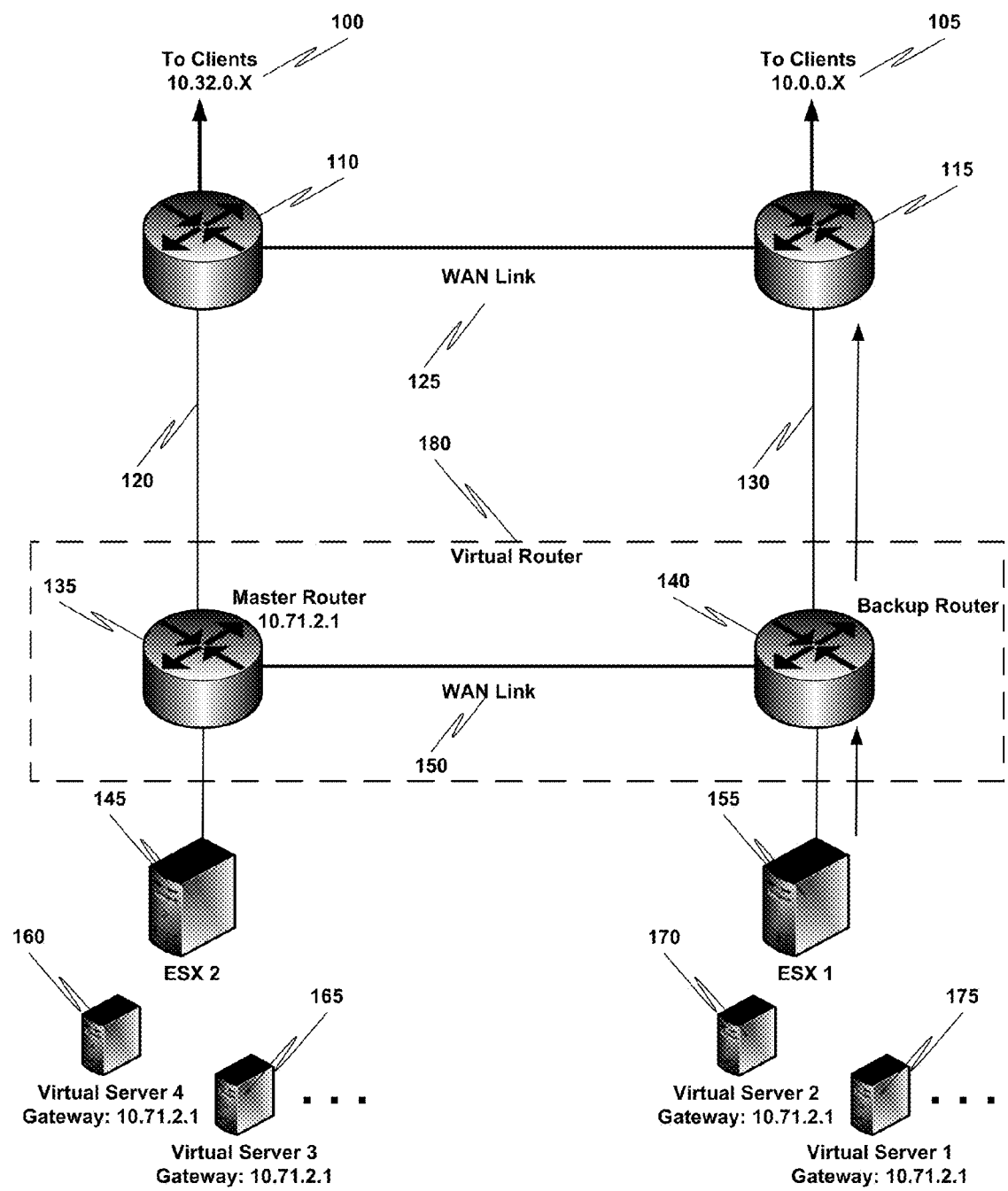
FIG. 1 is a block diagram that illustrates a system for virtual router redundancy for server virtualization in accordance with one embodiment.

Embodiments of the present invention are described herein in the context of virtual router redundancy for server virtualization. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment, the components, processes and/or data structures may be implemented using machine language, assembler, C or C++, Java and/or other high level language programs running on a data processing computer, such as a network switch that includes one or more PowerPC microprocessors, personal computer, workstation computer, mainframe computer, or high performance server. Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes any manner of data network, including, but not limited to, networks sometimes (but not always and sometimes overlappingly) called or exemplified by local area networks (LANs), wide area networks (WANs), metro area networks (MANs), storage area networks (SANs), residential networks, corporate networks, inter-networks, the Internet, the World Wide Web, cable television systems, telephone systems, wireless telecommunications systems, fiber optic networks, token ring networks, Ethernet networks, Fibre Channel networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "system" describes any computer information and/or control device, devices or network of devices, of hardware and/or software, comprising processor means, data storage means, program means, and/or interface means, which is adapted to communicate with the embodiments of the present invention, via one or more data networks or connections, and is adapted for use in conjunction with the embodiments of the present invention.

In the context of the present invention, the term "target address" describes a unique identifier assigned to a target such as a network adapter, host bus adapter (HBA), network interface card, or virtual router, for identification of the target in a network. If assigned by a manufacturer of the target, the target address may also encode the manufacturer's registered identification number. The term "target address" includes an Ethernet hardware address or Media Access Control (MAC) address in an Ethernet network. The term "target address" also includes a World Wide Name (WWN) or World Wide Identifier (WWID) that identifies a particular Fibre Channel, Advanced Technology Attachment (ATA), or Serial Attached SCSI (SAS) target.

In the context of the present invention, the term "associative store" describes a component configured to search a data store to determine whether a received data word is stored anywhere in the data store. If the data word is found, the associative store returns a list of one or more storage addresses where the data word was found. The associative store optionally returns the data word, or other associated data. An associative store may be a content-addressable memory (CAM), also known as an associative memory. Alternatively, an associative store may be based on a linear table search or a binary table search.

It should be noted that the virtual router redundancy for server virtualization system is exemplary of the present invention, but the present invention is not so limited. The exemplary embodiments illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Example embodiments of the present invention provide a solution where a backup router (or backup device of any sort) selectively bypasses a master router (or master device of any sort) and forwards packets towards a destination through physical interfaces on the backup router, versus prior systems where the backup router initially forwards the packet to the master router as a matter of course.

In a particular embodiment, a Layer 2 target address for the virtual router is programmed as a destination address entry for at least one physical interface of the backup router. Packets having a destination address matching the Layer 2 target address of the virtual router and received on the physical interface trigger forwarding towards the destination based on routing information in the backup router. Forwarding the packets by the backup router based on routing information instead of automatically first switching the packets to the master router avoids unnecessary traversals of a WAN link between the backup router and the master router.

FIG. 1 is a block diagram that illustrates a system for virtual router redundancy for server virtualization in accordance with one embodiment. In FIG. 1, the virtual servers (160, 165, 170, 175) are capable of being dynamically moved between ESX servers ESX1 (155) and ESX2 (145). Since each time a virtual server (160, 165, 170, 175) is activated it can be on a different ESX server (145, 155), sometimes the traffic needs to cross the WAN 150 twice before it reaches the client. For example, in prior solutions, traffic from virtual server 1 (175) to client at 10.0.0.X (105) is automatically switched to master router 135 of virtual router 180, then routed back to the backup router 140 of virtual router 180, and then routed to the client 105. Whereas according to one embodiment, the traffic that is destined to the clients at 10.0.0.X (105) will travel through a short-path forwarding path (from backup router 140 to router 115 to client at 10.0.0.X (105)). Packets that come from the local subnet of the virtual router IP address are routed to the master router 135.

Backup router 140 includes logic to function as a backup router or a master router. Similarly, master router 135 includes logic to function as a master router or a backup router. As shown in FIG. 1, router 135 has been configured to operate as a master router; router 135 may subsequently be configured to operate as a backup router. Also shown in FIG. 1, router 140 has been configured to operate as a backup router; it may be subsequently configured to operate as a master router.

Figure 2:
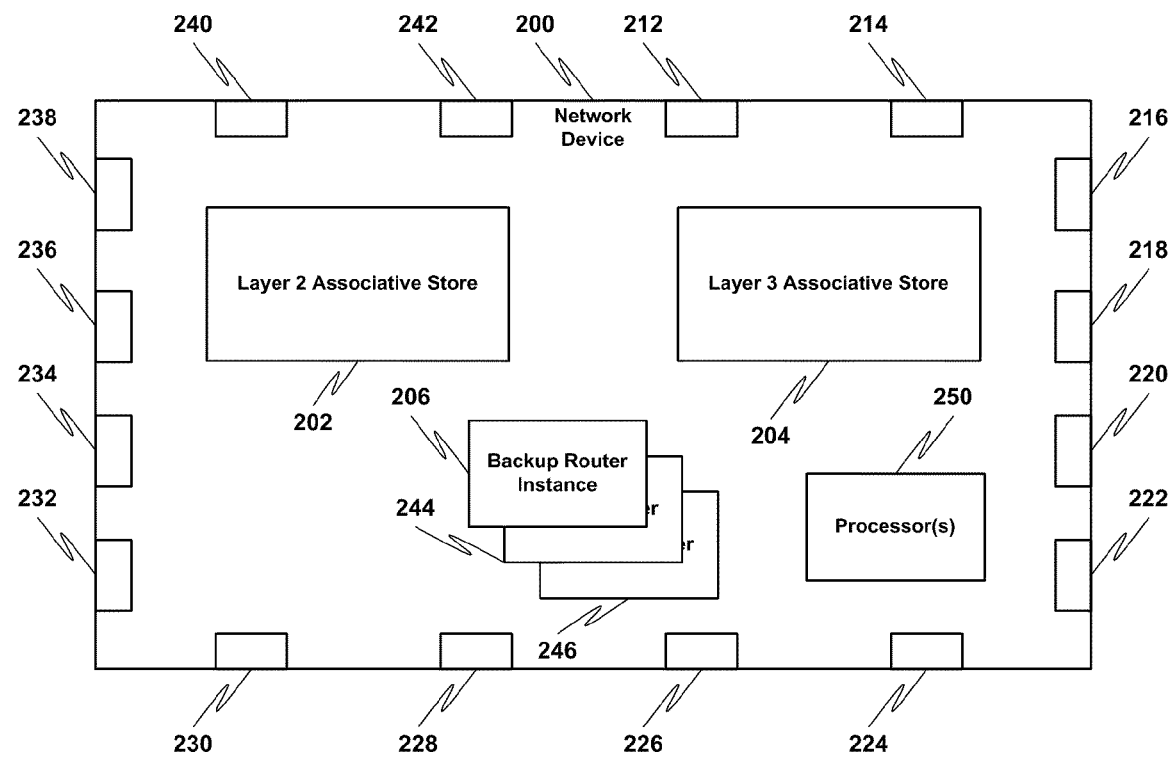
FIG. 2 is a block diagram that illustrates a network device for virtual router redundancy for server virtualization in accordance with one embodiment.

FIG. 2 is a block diagram that illustrates a network device for virtual router redundancy for server virtualization in accordance with one embodiment. FIG. 2 provides more detail for backup router 140 of FIG. 1. FIG. 2 also provides more detail for master router 135 of FIG. 1 when subsequently configured to operate as a backup router. As shown in FIG. 2, network device 200 comprises multiple ports (212-242), a Layer 2 associative store 202, a Layer 3 associative store 204, and one or more backup router instances (206, 244, 246).

Layer 2 associative store 202 and Layer 3 associative store 204 facilitate hardware forwarding. As packets flow into, through, and out of network device 200 from a source towards a destination, one or more processors 250 record forwarding information about the flow in the associative store entries. An associative store entry generally contains next-hop information, for example, some or all of the outgoing port, the target address of the next-hop router, and the virtual local area network (VLAN) tag. Once network device 200 has this information in its associative stores, packets with the same source and destination can be forwarded by hardware ("hardware forwarded") without the aid of the one or more processors 250, decreasing forwarding time.

Layer 2 associative store 202 entries comprise, for instance, destination physical information. Layer 2 associative store 202 entries may also include priority and VLAN information. Layer 3 associative store 204 entries comprise, for instance, destination IP information.

Backup router 206 is an instance configured to function as a backup router for a master router 135. Network device 200 may also include one or more additional backup router instances (244, 246) configured as backup routers for other master routers 135. A virtual router 180 represents the master router 135 and backup router (140, 206) acting as a group. A Layer 2 target address of the virtual router is programmed as a destination address entry in Layer 2 associative store 202 for at least one physical interface (212-242) of the backup router 206.

According to one embodiment, whenever the short path forwarding feature is enabled on a physical interface in the backup router 140, a Layer 2 target address for the virtual router is programmed as a destination address entry in a Layer 2 associative store for a physical interface on a backup router 140. According to another embodiment, a Layer 2 associative store is programmed for each member port of a virtual environment (VE) in a backup router 140.

Figure 3:
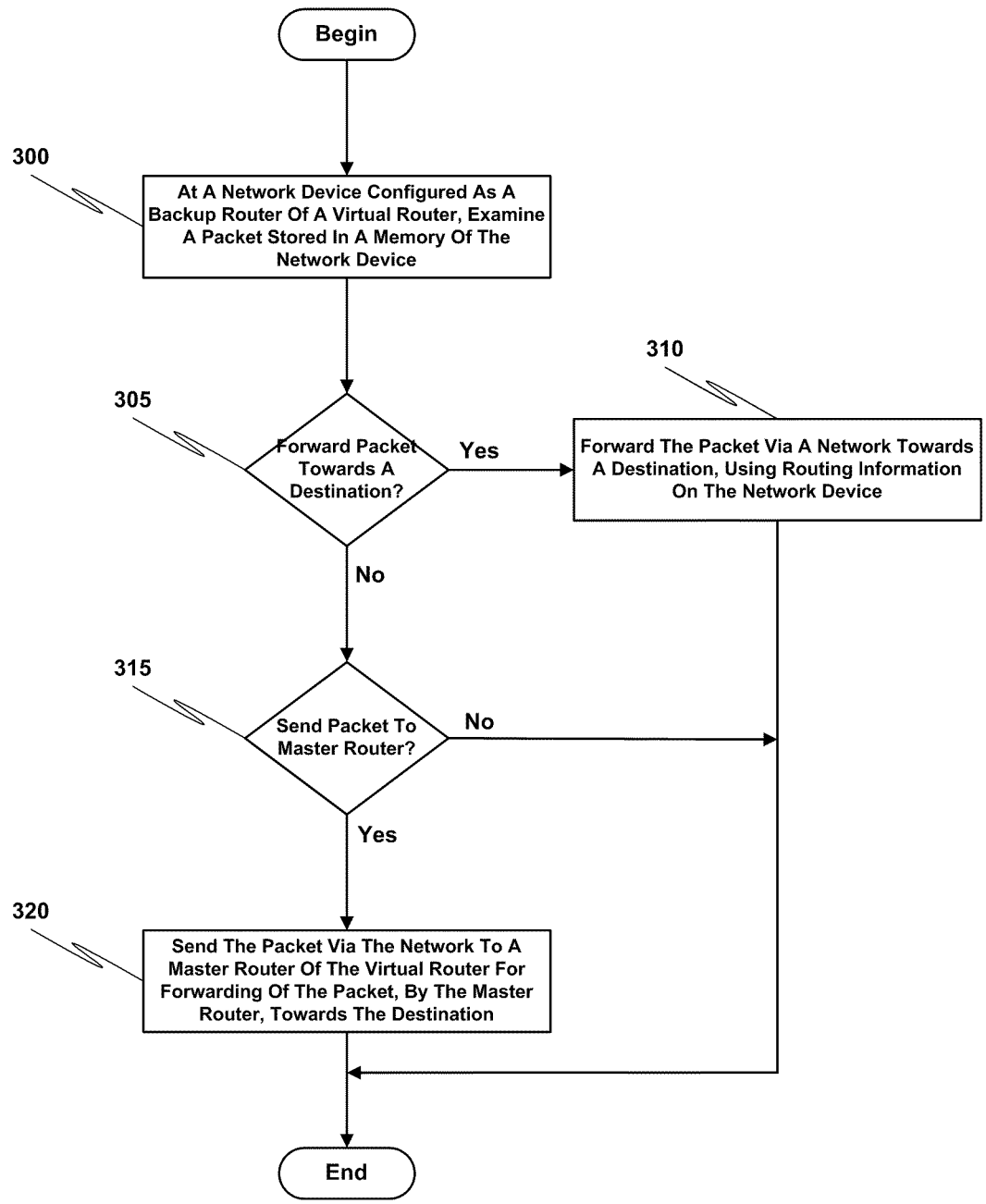
FIG. 3 is a flow diagram that illustrates a method for virtual router redundancy for server virtualization in accordance with one embodiment.

FIG. 3 is a flow diagram that illustrates a method for virtual router redundancy for server virtualization in accordance with one embodiment. The processes illustrated in FIG. 3 may be implemented in hardware, software, firmware, or a combination thereof. For example, the processes illustrated in FIG. 3 may be implemented by network device 200 of FIG. 2. At 300, at a network device configured as a backup router of a virtual router, a packet stored in a memory of the network device is examined. The portion of the packet examined may include information for use in determining whether to forward the packet via a network towards a destination. According to one embodiment, the information comprises a target address of a virtual router. According to another embodiment, the information comprises other identifying information for a virtual router, such as virtual router name. According to another embodiment, the information comprises an indication of where information identifying the virtual router may be obtained.

Still referring to FIG. 3, at 305, responsive to the examination at 300, a determination is made regarding whether to forward the packet via a network towards the destination. At 310, if the determination at 305 indicated the packet should be forwarded, the packet is forwarded via the network towards the destination. At 315, if the determination at 305 indicated the packet should not be forwarded, a determination is made regarding whether to send the packet to the master router 135. At 320, if the determination at 315 indicated the packet should be sent, the packet is sent via the network to a master router 135 of the virtual router 180 for forwarding of the packet, by the master router 135, towards the destination.

Figure 4:
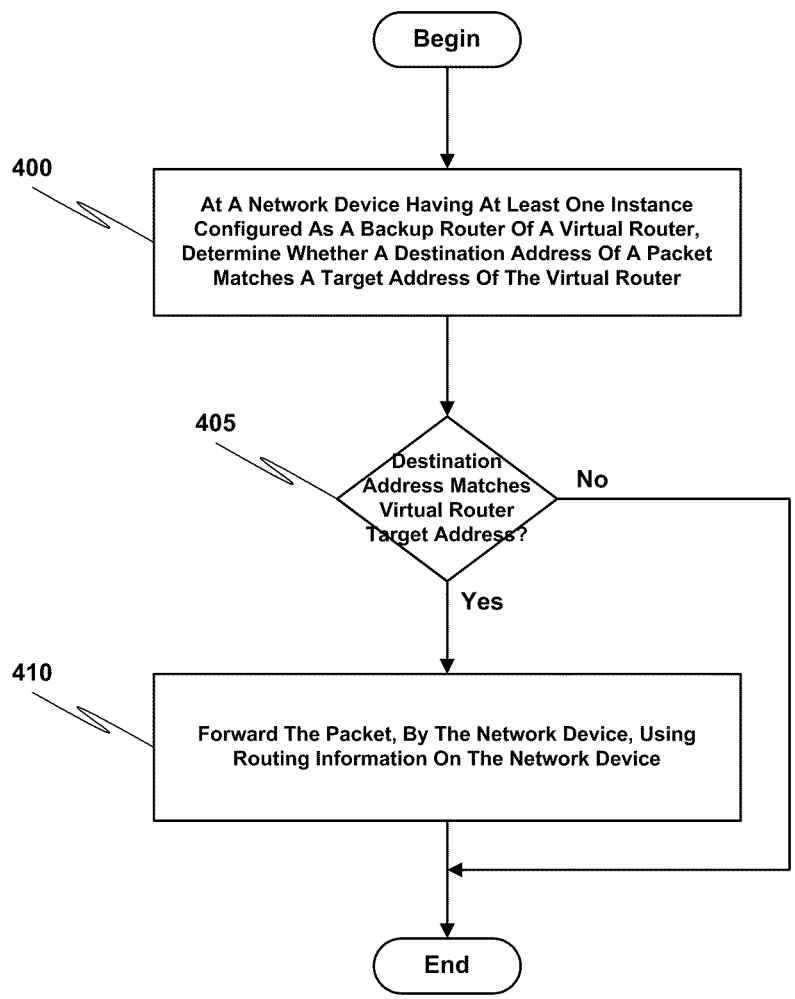
FIG. 4 is a flow diagram that illustrates a method for virtual router redundancy for server virtualization in accordance with one embodiment.

FIG. 4 is a flow diagram that illustrates a method for virtual router redundancy for server virtualization in accordance with one embodiment. FIG. 4 provides more detail for FIG. 3, where the information in the packet that is examined comprises a target address of a virtual router 180. The processes illustrated in FIG. 4 may be implemented in hardware, software, firmware, or a combination thereof. For example, the processes illustrated in FIG. 4 may be implemented by network device 200 of FIG. 2. At 400, at a network device 200 having at least one instance (206, 244, 246) configured as a backup router 140 for a virtual router 180 having a virtual router target address, a determination is made regarding whether a destination address of a packet at a receiving port of the network device 200 matches the virtual router target address.

At 410, if the destination address matches the virtual router target address, the packet is forwarded by the network device 200 using routing information on the network device 200. For instance, based on the destination address of the packet (and/or other information in the packet), an input port packet processor ASIC(s) of network device 200 may perform one or more lookups in a programmed associative store and then, based on the one or more lookups, may forward the packet toward a selected output port of the network device 200. Alternatively, the forwarding may be performed by a microprocessor of network device 200 operating under program control and accessing one or more tables in a memory of network device 200.

Figure 5:
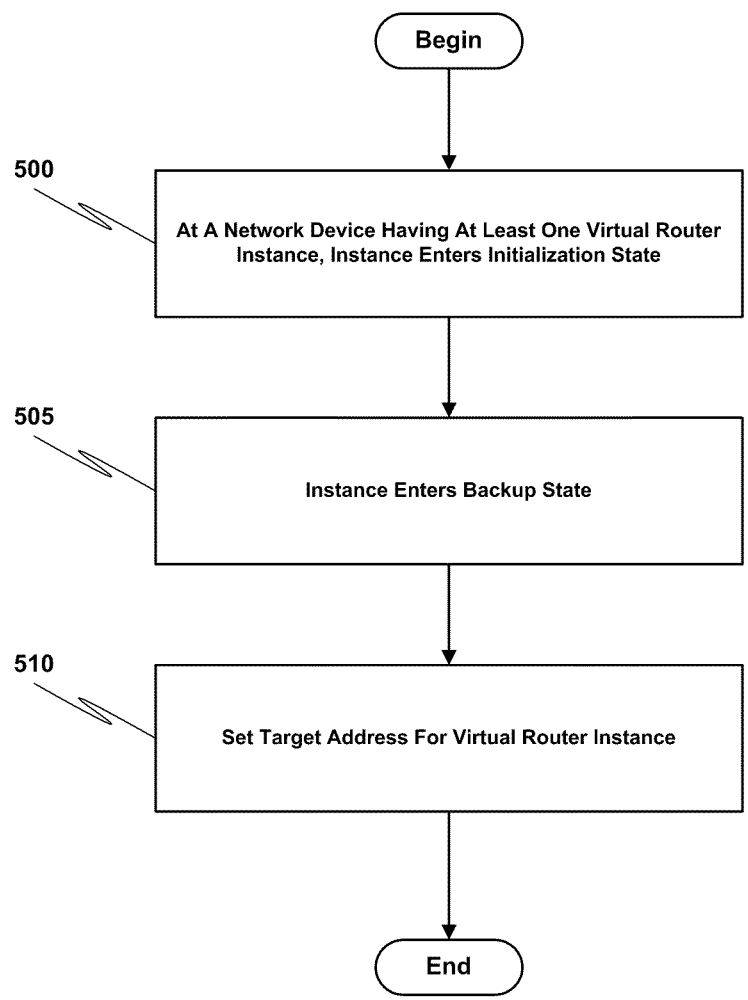
FIG. 5 is a flow diagram that illustrates a method for virtual router redundancy for server virtualization in accordance with one embodiment.
Figure 6:
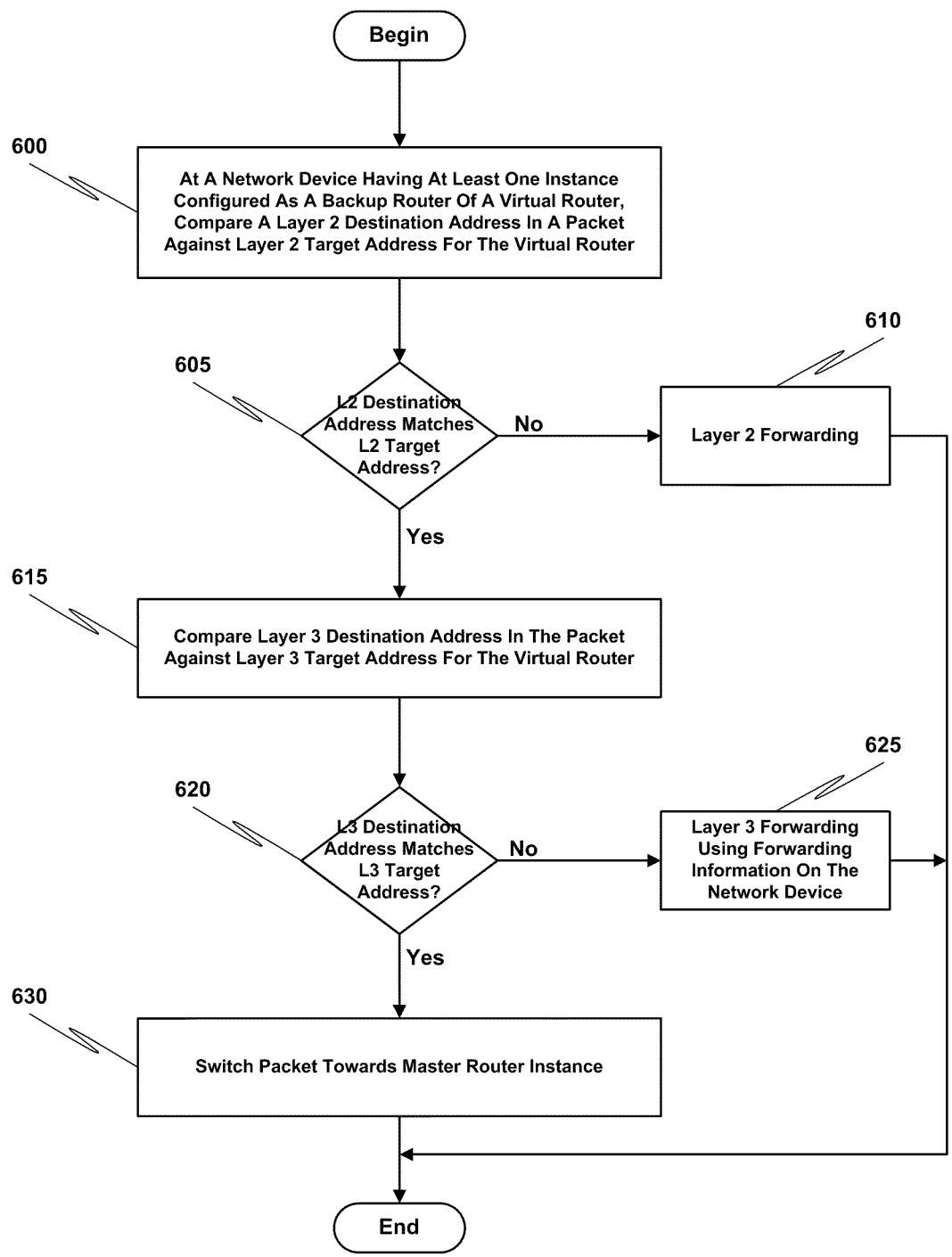
FIG. 6 is a flow diagram that illustrates a method for virtual router redundancy for server virtualization in accordance with one embodiment.

FIGS. 5 and 6 provide more detail for an embodiment that looks at a first virtual router target address comprising a Layer 2 address for a virtual router, and a second virtual router target address comprising a Layer 3 address for the virtual router to determine whether a network device configured as a backup router for a virtual router should forward a packet using routing information on the network device. FIG. 5 illustrates initialization of the backup router, and FIG. 6 illustrates operation of a backup router that has been initialized as shown in FIG. 5.

FIG. 5 is a flow diagram that illustrates a method for virtual router redundancy for server virtualization in accordance with one embodiment. FIG. 5 illustrates how a virtual router instance is initialized when configured to operate as a backup router. The processes illustrated in FIG. 5 may be implemented in hardware, software, firmware, or a combination thereof. For example, the processes illustrated in FIG. 5 may be implemented by network device 200 of FIG. 2. At 500, at a network device 200 having at least one virtual router instance 206, the instance enters an "Initialization" state. At 505, the instance enters a "Backup" state. After entering the "Backup" state, at 510 the instance 206 sets a target address for the virtual router instance 206. According to one embodiment, setting the target address comprises setting a first target address that comprises a Layer 2 address of the virtual router 180, and setting a second target address that comprises a layer 3 address of the virtual router 180. The Layer 2 address may comprise, for example, a MAC address. The Layer 3 address may comprise, for example, an IP address.

FIG. 6 is a flow diagram that illustrates a method for virtual router redundancy for server virtualization in accordance with one embodiment. FIG. 6 illustrates how a virtual router configured as a backup router operates once initialized as shown in FIG. 5. The processes illustrated in FIG. 6 may be implemented in hardware, software, firmware, or a combination thereof. For example, the processes illustrated in FIG. 6 may be implemented by network device 200 of FIG. 2. At 600, at a network device 200 having at least one instance 206 configured as a backup router 140 of a virtual router 180, a Layer 2 destination address in a packet is compared with a Layer 2 target address for the virtual router 180. At 605, a determination is made regarding whether the Layer 2 destination address matches the Layer 2 target address. If the Layer 2 destination address does not match the Layer 2 target address, at 610 Layer 2 forwarding of the packet is performed using forwarding information on the network device 200. If at 605 the Layer 2 destination address matches the Layer 2 target address, then at 620 a Layer 3 destination address in the packet is compared with a Layer 3 target address for the virtual router 180.

According to one embodiment, a backup router 140 includes enhanced logic to handle Layer 3 access to for management of the master router. Such management may include telnet, ping, Simple Network Management Protocol (SNMP) and other management mechanisms to manage the master router. When a backup router 140 receives packets addressed to the Layer 2 physical address of the virtual router, it further examines the Layer 3 destination address of the packet. If the Layer 3 destination address is set to the Layer 3 target address for the virtual router, the backup router 140 will switch (not route) the packet to the master router 135. This will allow management access to the master router 135 at all times. This is explained in more detail below with reference to reference numerals 620 and 630 of FIG. 6.

Referring again to FIG. 6, at 620 a determination is made regarding whether the Layer 3 destination address matches the Layer 3 target address. If the Layer 3 destination address does not match the Layer 3 target address, then at 625 Layer 3 forwarding of the packet is performed using forwarding information on the network device 200. If at 620 the Layer 3 destination address matches the Layer 3 target address, then at 630 the packet is switched towards the master router instance 135 of the virtual router 180.

According to one embodiment, the Layer 2 target address is stored in a first associative store 202 of the network device 200, and the Layer 3 target address is stored in a second associative store 204 of the network device 200. According to another embodiment, at least one of the first associative store 202 and the second associative store 204 comprises a CAM.

According to one embodiment, interfaces on different routers with the same virtual router ID (VRID) have the same short-path-forwarding configuration. This ensures that the short-path forwarding behavior is still retained after failover. Different VRIDs can be configured differently.

According to one embodiment, Internet Control Message Protocol (ICMP) redirects are disabled to prevent degradation of router performance. Referring again to FIG. 1, suppose virtual server 1 (175) tries to send traffic to a host in 10.32.0.x (100) that is connected through router 110. Since all the interfaces on master router 135, and since the backup router 140 and the virtual server 1 (175) are on the same IP subnet, if ICMP redirects are enabled, the backup router 140 will send an ICMP redirect message to virtual router 1 (175) with a new nexthop IP address pointing to the master router's interface IP address. In addition, if ICMP redirect was enabled on the master router 135, the traffic that was sent to the master router 135 will ICMP redirect processing to be performed by the master router processor and then the packed will be software forwarded back to the backup router 140. Both of these cases will degrade the performance and put extra loads on the processor. Accordingly, in one embodiment, the ICMP redirects are disabled.

According to one embodiment, the short path forwarding feature is dynamically enabled or disabled. A network device 200 may be configurable to operate with the short path forwarding feature enabled. A network device 200 may also be configurable to operate with the short path forwarding feature disabled. Enabling or disabling the short path forwarding feature may be done manually, such as via a user command. Enabling or disabling the short path forwarding feature may also be done automatically upon the occurrence of one or more predefined events.

While embodiments and applications of this invention have been described with respect to Layer 2 (Data Link Layer) and Layer 3 (Network Layer) of the Open System Interconnection Reference Model (OSI Reference Model or OSI Model) for networks, the invention is not so limited. Embodiments of the invention may be applied to other networks, such as Fibre Channel networks. More generally, embodiments of the invention may be applied to any network where a backup router determines, based on the content of a packet, to forward the packet itself rather than sending the packet to a master router first.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
at a network device having at least one instance configured as a backup router of a virtual router, comparing a Layer 2 destination address in a packet against a Layer 2 target address for the virtual router;
if the Layer 2 destination address matches the Layer 2 target address, comparing a Layer 3 destination address in the packet against a Layer 3 target address for the virtual router;
if the Layer 3 destination address matches the Layer 3 target address, forwarding the packet towards an instance configured as a master router of the virtual router; and
if the Layer 3 destination address does not match the Layer 3 target address, forwarding the packet by the network device using routing information on the network device.

2. The method of claim 1 wherein
the Layer 2 target address is stored in a first associative store of the network device; and
the Layer 3 target address is stored in a second associative store of the network device.

3. The method of claim 1 wherein at least one of the first associative store and the second associative store comprises a content addressable memory (CAM).

4. The method of claim 1 wherein
the Layer 2 target address comprises a media access control (MAC) address; and
the Layer 3 target address comprises an Internet Protocol (IP) address.

5. The method of claim 2 wherein
virtual router instance states comprise a "Master" state, a "Backup" state, and an "Initialize" state;
the Layer 2 target address is stored in the first associative store upon the backup router entering the "Backup" state,
the Layer 3 target address is stored in the second associative store upon the backup router entering the "Backup" state.

6. The method of claim 1, further comprising, before comparing the Layer 2 destination address in the packet against the Layer 2 target address for the virtual route, disabling Internet Control Message Protocol (ICMP) redirects.

7. A network device comprising:
a memory; and
one or more processors configured to:
compare a Layer 2 destination address in a packet against a Layer 2 target address for a virtual router, the network device having at least one instance configured as a backup router of the virtual router;
if the Layer 2 destination address matches the Layer 2 target address, compare a Layer 3 destination address in the packet against a Layer 3 target address for the virtual router;
if the Layer 3 destination address matches the Layer 3 target address, forward the packet towards an instance configured as a master router of the virtual router; and
if the Layer 3 destination address does not match the Layer 3 target address, forward the packet by the network device using routing information on the network device.

8. The network device of claim 7 wherein
the Layer 2 target address is stored in a first associative store of the network device; and
the Layer 3 target address is stored in a second associative store of the network device.

9. The network device of claim 7 wherein at least one of the first associative store and the second associative store comprises a content addressable memory (CAM).

10. The network device of claim 7 wherein
the Layer 2 target address comprises a media access control (MAC) address; and
the Layer 3 target address comprises an Internet Protocol (IP) address.

11. The network device of claim 8 wherein
virtual router instance states comprise a "Master" state, a "Backup" state, and an "Initialize" state;
the Layer 2 target address is stored in the first associative store upon the backup router entering the "Backup" state,
the Layer 3 target address is stored in the second associative store upon the backup router entering the "Backup" state.

12. The network device of claim 7 wherein the one or more processors are further configured to, before comparing the Layer 2 destination address in the packet against the Layer 2 target address for the virtual route, disable Internet Control Message Protocol (ICMP) redirects.

13. A program storage device readable by a machine, embodying a program of instructions executable by the machine to perform a method, the method comprising:
at a network device having at least one instance configured as a backup router of a virtual router, comparing a Layer 2 destination address in a packet against a Layer 2 target address for the virtual router;
if the Layer 2 destination address matches the Layer 2 target address, comparing a Layer 3 destination address in the packet against a Layer 3 target address for the virtual router;
if the Layer 3 destination address matches the Layer 3 target address, forwarding the packet towards an instance configured as a master router of the virtual router; and
if the Layer 3 destination address does not match the Layer 3 target address, forwarding the packet by the network device using routing information on the network device.

* * * * *